United States Patent
Shipley

(10) Patent No.: US 9,118,177 B2
(45) Date of Patent: Aug. 25, 2015

(54) POWER CONTROLLER SYSTEM

(75) Inventor: Adrian Shipley, Cheltenham (GB)

(73) Assignee: GE Aviation Systems, LLC, Grand Rapids, MI (US)

( * ) Notice: Subject to any disclaimer, the term of this patent is extended or adjusted under 35 U.S.C. 154(b) by 818 days.

(21) Appl. No.: 13/278,206

(22) Filed: Oct. 21, 2011

(65) Prior Publication Data

US 2012/0153928 A1 Jun. 21, 2012

(30) Foreign Application Priority Data

Oct. 22, 2010 (GB) .................................... 1017887.9

(51) Int. Cl.
| | |
|---|---|
| *G05F 3/02* | (2006.01) |
| *H02H 1/04* | (2006.01) |
| *H02H 3/06* | (2006.01) |
| *H02H 3/22* | (2006.01) |
| *H02H 3/093* | (2006.01) |
| *H02H 3/087* | (2006.01) |

(52) U.S. Cl.
CPC ................ *H02H 3/06* (2013.01); *H02H 3/093* (2013.01); *H02H 3/22* (2013.01); *H02H 3/087* (2013.01)

(58) Field of Classification Search
CPC .............. G05F 3/02; H02H 1/04; H02H 3/22; H02H 3/06
USPC ............................ 307/125, 130, 131; 361/118
See application file for complete search history.

(56) References Cited

U.S. PATENT DOCUMENTS

| | | | |
|---|---|---|---|
| 5,654,859 | A | 8/1997 | Shi |
| 7,656,634 | B2 | 2/2010 | Robertson et al. |
| 7,957,117 | B2 * | 6/2011 | Divan ............................ 361/118 |
| 2003/0183838 | A1 | 10/2003 | Huang et al. |
| 2006/0056118 | A1 * | 3/2006 | Huczko et al. ..................... 361/6 |
| 2006/0152877 | A1 | 7/2006 | Buzzard et al. |
| 2008/0106152 | A1 | 5/2008 | Maier |

FOREIGN PATENT DOCUMENTS

| | | |
|---|---|---|
| CN | 2191129 Y | 3/1995 |
| CN | 2757400 Y | 2/2006 |
| EP | 1385249 A1 | 1/2004 |
| EP | 1635437 A1 | 3/2006 |
| JP | 2008125319 A | 5/2008 |

OTHER PUBLICATIONS

Meux et al., "Standardizing solid state electric distribution components for a greener and cheaper aircraft", More Electric Aircraft Forum, pp. 1-6.

(Continued)

*Primary Examiner* — Hal Kaplan
(74) *Attorney, Agent, or Firm* — General Electric Company; William S. Munnerlyn

(57) ABSTRACT

A power controller system configured to electrically supply a load via a circuit is provided. The system comprises, a switching device provided in an electrical pathway for supplying current to the load, a controller configured to open the switching device when a current through or voltage across the switching device exceeds a predetermined level; and an electrical pathway provided parallel to the load to enable load current to continue to flow through the parallel electrical pathway and the load when the switching device is open to dissipate inductive energy stored in the circuit connecting the parallel electrical pathway to the load.

12 Claims, 2 Drawing Sheets

(56) References Cited

OTHER PUBLICATIONS

GB Search Report issued on Apr. 8, 2011 in connection with GB Patent Application No. 1017887.9 filed on Oct. 22, 2010.
GB Official Action from corresponding GB Application No. 1017887.9 dated Apr. 17, 2013.
Unofficial English translation of Chinese Office Action issued in connection with corresponding CN Application No. 201110335910.1 on Dec. 17, 2014.
Unofficial English Translation of Japanese Office Action issued in connection with corresponding JP Application No. 2011228394 on Apr. 14, 2015.

* cited by examiner

POWER CONTROLLER SYSTEM

BACKGROUND OF THE INVENTION

1. Field of the Invention

The field of the invention relates to a power controller system, in particular to a power controller system which is protected from lightning strikes or fault conditions for example.

2. Description of Related Art

Traditionally a power controller system includes a switching device such as an electro-mechanical switch to interrupt the supply of electrical power to a load in the event of a lightning strike or fault condition. However, in order to try to provide faster reaction times and reduce the size and cost of switching devices, faster operating devices are being used such as micro-electromechanical switches (MEMS) and transistors, such as MOSFETs. Although these devices are faster in operation, their size is proportional to the fault transient that they can accommodate. As they generally have a relatively low thermal mass, they can only accommodate a limited fault transient.

In aviation applications, such as in an aircraft, it is important that a fault condition or lightning strike does not interrupt the current to a given load which may be crucial to the aircraft such as, for example, cockpit controls and instruments, landing gear, engine control, environmental systems etc. Furthermore, electrical power distribution in the aviation industry is moving to higher and higher voltage architectures such that the fault current and environmental considerations such as lightning strikes are becoming more and more severe. Traditionally the power distribution system is over engineered, for example with the transistor switch being much larger to he able to absorb such events as lightning strikes and faults without interrupting the load during such transients. However, over engineering the power distribution system and switches increases cost, size and weight, reducing an aircraft's range and increasing its fuel consumption.

BRIEF SUMMARY OF THE INVENTION

One embodiment of the present invention provides a power controller system configured to electrically supply a load via a circuit. The system comprises a switching device provided in an electrical pathway for supplying current to the load, a controller configured to open the switching device when a current through or voltage across the switching device exceeds a predetermined level; and an electrical pathway provided parallel to the load to enable load current to continue to flow through the parallel electrical pathway and the load when the switching device is open to dissipate inductive energy stored in the circuit connecting the parallel electrical pathway to the load.

During a fault transient scenario, such as a lightning strike when the current through the switching device exceeds a predetermined level, for example ten times the intended current, the switching device will be commanded off by the controller. During this time, the load current will continue to flow through the electrical pathway parallel to the load, dissipating the inductive energy stored in the circuit cables connecting the distribution system and the load. Consequently, the load current will not be interrupted which is very important in aviation for example, for systems relied upon by an aircraft during flight.

An alternate embodiment of the present invention provides a method of operating a power controller system configured to electrically supply a load via a circuit. The method comprises opening a switching device in an electrical pathway for supplying a current to the load when a current through or voltage across the switching device exceeds a predetermined level such that the load current continues to flow through the load, and an electrical pathway in parallel with the load to dissipate inductive energy stored in the circuit including and connecting the parallel electrical pathway to the load.

BRIEF DESCRIPTION OF THE SEVERAL VIEWS OF THE DRAWINGS

Embodiments of the present invention will now be described, by way of example only, with reference to the accompanying drawings, in which.

DETAILED DESCRIPTION OF THE INVENTION

Figure 1:
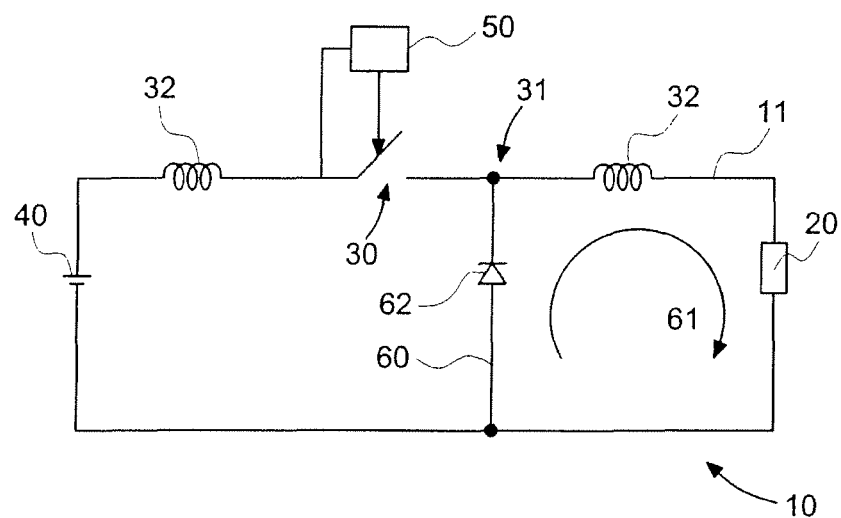
FIG. 1 shows a power controller system with a load illustrating an example of an embodiment of the present invention.

FIG. 1 shows a power controller system 10 arranged to electrically supply a load 20. The power controller system includes a circuit 11 comprising a switching device 30 provided in an electrical pathway 31 for supplying current to the load. 20, The electrical pathway 31 includes an electrical supply 40 connected to the switching device 30 which, in turn, is connected to the load 20. In practice, the electrical pathway 31 may generally comprise electrical cables or the like which may be several metres or several tens of metres long, depending upon the aircraft, and which inherently provide a certain amount of inductance indicated in FIG. 1 by symbols numbered 32.

A controller 50 is arranged to open the switching device 30 when a current through or voltage across the switching device 30 exceeds a predetermined level, The controller 50 is preferably connected to the electrical pathway 31 to detect the current passing therethrough or voltage across the switching device 30. The controller 50 may include a suitable control means such as a micro processor to open the switching device 30 when the detected current or voltage exceeds the predetermined level. The switching device 30 may be any suitable device such as a transistor, for example a MOSFET, a MEMS or an electro-mechanical switch for example.

An electrical pathway 60 is provided parallel to the load 20. When the controller 50 opens the switching device 30, disconnecting the supply 40 from the load 20, current is able to continue to flow through the parallel electrical pathway 60 and the load 20 as indicated by the arrow 61 to dissipate inductive energy 32 stored in the circuit connecting the parallel electrical pathway 60 to the load 20, The circuit will typically be formed from cables or the like. The parallel electrical pathway 60 may include a diode 62 to ensure that current continues to flow through the load 20 in the same direction as when the switch 30 was closed.

The controller 50 is preferably arranged to close the switching device 30 again after a predetermined, period of time. This predetermined period of time will be dependent upon the amount of inductance in the circuit connecting the parallel electrical pathway 60 to the load 20 and the likely duration of a transient event, such as a lightning strike or the time for a fault to be automatically corrected. This predetermined period of time may, for example, be a few microseconds, tens of microseconds or longer depending upon the amount of inductance in the system, which may be parasitic or may include the effect of added components, The inductance in the circuit connecting the parallel electrical pathway 60 to the load 20 may be appropriate to provide sufficient time for a current to be maintained as indicated by arrow 61 such that the transient event will have substantially subsided by the time that the switch 30 is closed again. However, if necessary additional inductances may be provided between the load 20 and the parallel pathway 60. After this predetermined period of time has elapsed, the controller 50 closes the switching device 30 so that electrical power may again be provided by the supply 40. This will refresh the inductance in the circuitry connecting the load 20 to the parallel electrical pathway 60. However, if the current through or voltage across the switching device 30 still exceeds the predetermined level, the controller 50 will open the switching device again such that the inductive energy 32 provided in the circuitry or cabling connecting the parallel electrical paths 60 and the load 20 will again be dissipated, The controller may continue to turn the switching device 30 on and, off until the transient event has passed or the fault has been corrected.

The example illustrated in FIG. 1 enables current to be continued to be supplied to a load 20 even in the event of a transient event, such as a lightning strike or a fault. This is of particular importance where it is desired to continue to supply a load even in the event of such a transient lightning strike or fault, for example in essential components in an aircraft such as cockpit or engine controls. This is achieved without having to over-engineer switching components as in the prior art, reducing costs and weight.

Figure 2:
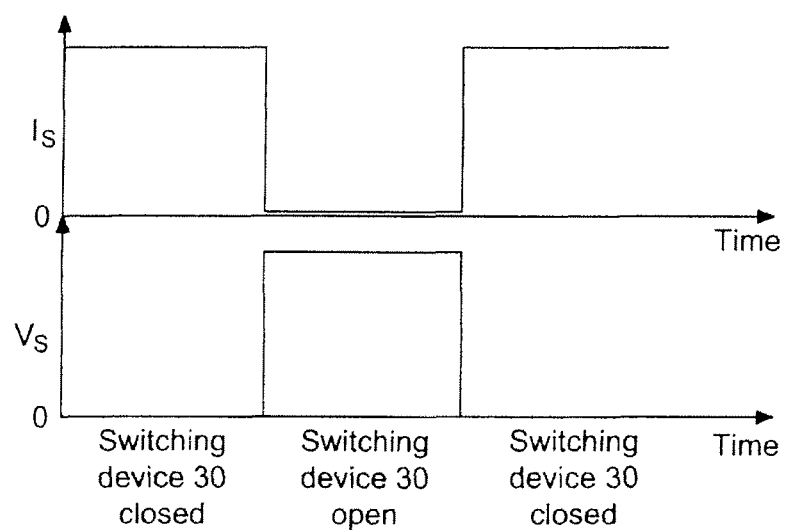
FIG. 2 is a graph illustrating the voltage across a switching device and. current through an electrical pathway parallel to the load during opening and closing of the switching device in accordance with embodiments of the present invention.

FIG. 2 illustrates the current $I_S$ through the switching device 30 and the voltage $V_S$ across the switching device 30 during the switching on and off of the switching device 30. As can be seen from FIG. 2, with the switching device 30 closed there is a current $I_S$ through it and no voltage $V_S$ across it. However, when a fault is detected with a current or voltage exceeding a predetermined level, the switching device 30 is opened such that there is no longer any current $I_S$ through the switching device 30 and a voltage $V_S$ is then provided across it. A current then flows through the parallel electrical pathway 60. After a predetermined period of time, during which the transient will have subsided considerably, the controller 50 closes the switching device 30 again resuming the current $I_S$ through the switching device 30 and ceasing the flow of current through the parallel electrical pathway 60.

If it is found that the voltage across or current through the switching device 30 still exceeds the predetermined level the switching 30 is opened for a second time. If necessary, the switching device 30 can be repeatedly opened and closed until the fault condition has subsided. Each closing of the switching device 30 will refresh the inductance 32 in the circuit, such as cables, connecting the load 20 with the parallel electrical pathway 60.

Figure 3:
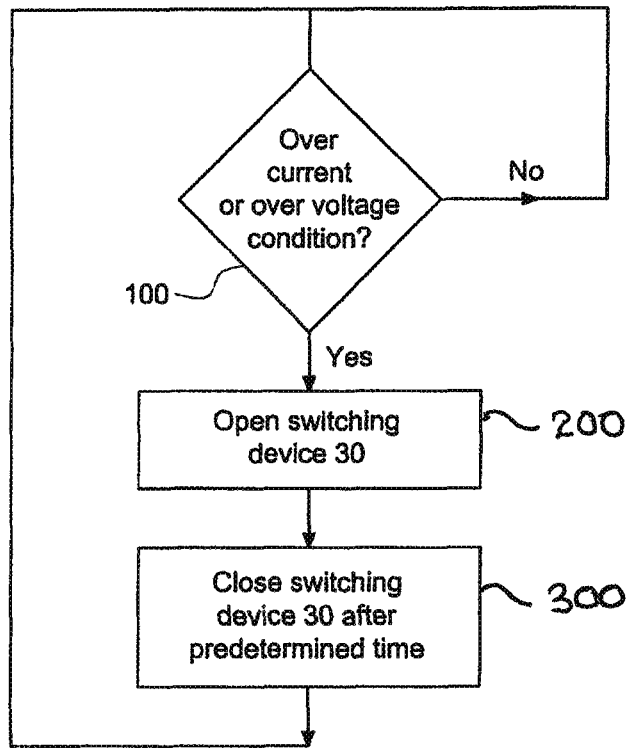
FIG. 3 shows a flow diagram illustrating a method of an embodiment of the present invention.

FIG. 3 is a flow diagram illustrating a method of operating a power controller system of an embodiment of the present invention. At time step 100 the controller 50 detects whether there is an over current or voltage condition. If there is an over current or voltage deleted, at step 200 the switching device 30 is opened ceasing the flow of current from the generator or supply 40. Whilst the switching device 30 is open, current continues to flow through the load 20 due to the inductance of the circuit 31 and the parallel electrical pathway 60.

At step 300 the controller closes the switching device 30 after a predetermined period of time after which the transient is likely to have subsided considerably. After closing the switching device 30, the controller 50 returns to step 100 at which it determines if there is an over current or over voltage condition at the switching device 30. If the transient has subsided sufficiently for the current through or voltage across the switching device 30 to be less than the predetermined levels, the switching device 30 remains closed. However, if the current through or voltage the switching device 30 is still above the predetermined level the sequence of steps 200, 300 illustrated, in FIG. 3 is repeated.

Figure 4:
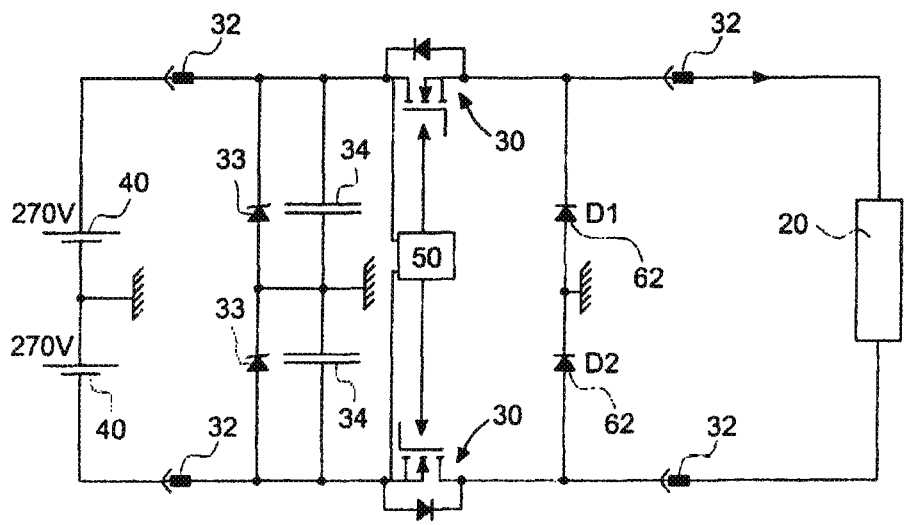
FIG. 4 show a more detailed example of a power controller system illustrating an embodiment of the present invention.

FIG. 4 shows a more detailed example of a power controller system illustrating an embodiment of the present invention. As can be seen from FIG. 4, many of the components are equivalent to those shown in FIG. 1 and are provided with the same reference numerals. The power controller system illustrated in FIG. 4 shows a possible architecture for a plus/minus 270 V DC distribution system. The switching devices 30 in this example are MOSFETs, but other switching devices such as MEMs or IGBTS may be used. During a fault transient scenario such as a lightning strike, when the current through the MOSFETs 30 exceeds a predetermined level (for example, 10 times the intended protection current) MOSFETs 30 will be commanded off by the controller 50. During this time the load current will continue to flow through the commutation diodes 62 dissipating the inductive energy stored in the cables and any inductive elements 32 connecting the system to the load 20. Diodes 33 and capacitors 34 are configured to form clamping circuits for the power controller system illustrated in FIG. 4.

The switching devices 30 will be commanded back on by the controller 50 a short duration later, by which time the transient will have subsided considerably. The net effect is that the load current was not interrupted during the transient and the full transient energy was not experienced by the MOSFETs, This technique provides the capability of a digital current limit for electrical power distribution purposes, removing the need for over engineering the switching components thus saving cost and weight.

Many variations may he made to the examples described above without departing from the scope of the present invention. For example, any number of loads 20 may be provided in the circuit or any number of circuits may be provided. Although described with reference to examples in the aviation industry, embodiments the present invention may be used in a power controller system in any application, for example a ship, a vehicle, a factory, a power supply grid or the home.

What is claimed is:

1. A power controller system configured to electrically supply a load via a circuit, the system comprising:
   a switching device provided in a first electrical pathway for supplying current to the load;
   a controller configured to open the switching device when a current through or voltage across the switching device exceeds a predetermined level; and
   a second electrical pathway provided parallel to the load and electrically coupled to the first electrical pathway when a state of the switching device is closed, a first inductive element in the second electrical pathway coupled in series with the load and configured to enable load current to continue to flow through the second electrical pathway and the load when the switching device is open to dissipate inductive energy stored in a second inductive element connecting the second electrical pathway to the load.

2. The system according to claim 1, wherein the second electrical pathway is configured such that the inductive energy stored in the circuit continues to flow in the same direction as when the switching device was closed.

3. The system according to claim 2, wherein the second electrical pathway includes a diode to ensure that the inductive energy stored in the circuit continues to flow in the same direction as when the switching device was closed.

4. The system according to claim 1, wherein the controller is configured to close the switching device after a predetermined period of time.

5. The system according to claim 4, wherein the controller is configured to open the switching device again if the current through or voltage across the switching device still exceeds the predetermined level.

6. The system according to claim 1, further comprising a second inductive element to increase the inductance between the parallel electrical pathway and the load.

7. An aircraft including a power controller system configured to electrically supply a load via a circuit, the system comprising:
   a switching device provided in a first electrical pathway for supplying current to the load;
   a controller configured to open the switching device when a current through or voltage across the switching device exceeds a predetermined level; and
   a second electrical pathway provided parallel to the load for providing current to the load, the second electrical pathway coupled to the first electrical pathway, and a first inductive element coupled in series to the second electrical pathway when the switching device is closed, the second electrical pathway configured to enable load current to continue to flow through the second electrical pathway and the load when the switching device is open to dissipate inductive energy stored in the first inductive element connecting the second electrical pathway to the load.

8. A method of operating a power controller system configured to electrically supply a load via a circuit, the method comprising;
   arranging, in parallel with a load, a first electrical pathway for supplying current to the load, and coupling the first electrical pathway with a second electrical pathway comprising a first inductive element coupled in series with the load; and
   opening a switching device in the first electrical pathway for supplying the current to the load when a current through or voltage across the switching device exceeds a predetermined level;
   wherein the load current continues to flow through the load and the second electrical pathway with the load to dissipate inductive energy stored in the first inductive element connecting the second electrical pathway to the load.

9. The method according to claim 8, further comprising closing the switching device a predetermined period of time after it was opened.

10. The method according to claim 9, further comprising opening the switching device again if the current through or voltage across the switching device still exceeds the predetermined level.

11. The method according to claim 10, further comprising repeatedly opening and closing the switching device until the current through or voltage across the switching device no longer exceeds the predetermined level.

12. A method of operating a power controller system of an aircraft the method comprising:
   arranging, in parallel with a load, a first electrical pathway for supplying current to the load, and coupling the first electrical pathway with a second electrical pathway comprising a first inductive element coupled in series with the load; and
   opening a switching device in the first electrical pathway for supplying the current to the load when a current through or voltage across the switching device exceeds a predetermined level;
   wherein the load current continues to flow through the load and the second electrical pathway to dissipate inductive energy stored in the first inductive element connecting the second electrical pathway to the load.

* * * * *

UNITED STATES PATENT AND TRADEMARK OFFICE
CERTIFICATE OF CORRECTION

PATENT NO. : 9,118,177 B2  Page 1 of 1
APPLICATION NO. : 13/278206
DATED : August 25, 2015
INVENTOR(S) : Shipley It is certified that error appears in the above-identified patent and that said Letters Patent is hereby corrected as shown below:

In Column 1, Line 33, delete "he" and insert -- be --, therefor.

In Column 2, Line 5, delete "load," and insert -- load --, therefor.

In Column 2, Line 18, delete "and." and insert -- and --, therefor.

In Column 2, Line 32, delete "load. 20," and insert -- load 20. --, therefor.

In Column 2, Line 42, delete "level," and insert -- level. --, therefor.

In Column 2, Line 57, delete "load 20," and insert -- load 20. --, therefor.

In Column 2, Line 63, delete "predetermined," and insert -- predetermined. --, therefor.

Signed and Sealed this
Eighth Day of March, 2016

Michelle K. Lee
*Director of the United States Patent and Trademark Office*